(12) United States Patent
Ishii et al.

(10) Patent No.: US 8,392,607 B2
(45) Date of Patent: Mar. 5, 2013

(54) RELAY DEVICE, CONTROL METHOD, AND PROGRAM

(75) Inventors: Tomoki Ishii, Kyoto (JP); Takao Yamaguchi, Osaka (JP); Atsushi Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 12/990,108

(22) PCT Filed: Jan. 25, 2010

(86) PCT No.: PCT/JP2010/000400
§ 371 (c)(1),
(2), (4) Date: Oct. 28, 2010

(87) PCT Pub. No.: WO2010/084775
PCT Pub. Date: Jul. 29, 2010

(65) Prior Publication Data
US 2011/0047291 A1    Feb. 24, 2011

(30) Foreign Application Priority Data
Jan. 26, 2009 (JP) .................................. 2009-014463

(51) Int. Cl.
*G06F 15/173* (2006.01)
(52) U.S. Cl. .......................... 709/238; 709/239; 709/240
(58) Field of Classification Search .................... 709/238
See application file for complete search history.

(56) References Cited

U.S. PATENT DOCUMENTS
5,668,806 A * 9/1997 Arai et al. ..................... 370/342
(Continued)

FOREIGN PATENT DOCUMENTS
JP    2005-64721     3/2005
JP    2005-286961    10/2005
(Continued)

OTHER PUBLICATIONS

Murata et al, Biologically Inspired Approaches to Advanced Information Technology, Lecture Notes in Computer Science, 2006, vol. 3853/2006, 48-63, DOI: 10.1007/11613022_7 (Resilient Multi-Path Routing Based on a Biological Attractor Selection Scheme).*

(Continued)

*Primary Examiner* — Peter-Anthony Pappas
*Assistant Examiner* — Ninos Donabed
(74) *Attorney, Agent, or Firm* — Wenderoth, Lind & Ponack, L.L.P.

(57) ABSTRACT

A relay node (203) is a relay node in relay nodes mutually connected through links to compose a communication network, the communication network including paths for transmitting communication data through the relay node (203), including a link status receiving unit (104) which receives at least one link status notification message which is accumulated according to a degree of maintainability of a path, at a time of link disconnecting, at each of the relay devices downstream of the relay device and is forwarded from the downstream relay node (203), a probability generating unit (106) which generates a probability value according to a predetermined probability distribution, a path selection unit (107) which selects one of the paths based on the number of the link status notification message and the probability value, and a relay processing unit (108) which relays the communication data from upstream to a downstream relay device on the path selected by the path selection unit (107).

5 Claims, 11 Drawing Sheets

U.S. PATENT DOCUMENTS

| | | | | |
|---|---|---|---|---|
| 6,016,306 | A | 1/2000 | Le Boudec et al. | |
| 6,400,681 | B1* | 6/2002 | Bertin et al. | 370/218 |
| 6,567,481 | B1* | 5/2003 | Molnar | 375/341 |
| 6,628,670 | B1* | 9/2003 | Galand et al. | 370/468 |
| 6,647,008 | B1* | 11/2003 | Galand et al. | 370/389 |
| 6,683,852 | B2* | 1/2004 | Nagarajan et al. | 370/235 |
| 6,934,249 | B1* | 8/2005 | Bertin et al. | 370/218 |
| 7,092,457 | B1* | 8/2006 | Chugg et al. | 375/324 |
| 7,324,552 | B1* | 1/2008 | Galand et al. | 370/468 |
| 7,463,890 | B2* | 12/2008 | Herz et al. | 455/445 |
| 7,593,321 | B2* | 9/2009 | Galand et al. | 370/218 |
| 7,630,463 | B2* | 12/2009 | Shin et al. | 375/344 |
| 7,650,151 | B2* | 1/2010 | Medepalli et al. | 455/450 |
| 7,656,815 | B2* | 2/2010 | Kellerer et al. | 370/252 |
| 7,987,180 | B2* | 7/2011 | Lim et al. | 707/716 |
| 8,005,054 | B2* | 8/2011 | Isozu | 370/338 |
| 8,140,706 | B2* | 3/2012 | Chi et al. | 709/241 |
| 2002/0087722 | A1* | 7/2002 | Datta et al. | 709/239 |
| 2003/0063624 | A1* | 4/2003 | Nagarajan et al. | 370/468 |
| 2004/0029553 | A1 | 2/2004 | Cain | |
| 2004/0114569 | A1 | 6/2004 | Naden et al. | |
| 2006/0031576 | A1 | 2/2006 | Canright | |
| 2006/0104254 | A1* | 5/2006 | Shin et al. | 370/343 |
| 2006/0259627 | A1* | 11/2006 | Kellerer et al. | 709/227 |
| 2006/0268933 | A1* | 11/2006 | Kellerer et al. | 370/469 |
| 2006/0291485 | A1* | 12/2006 | Thubert et al. | 370/401 |
| 2007/0073734 | A1* | 3/2007 | Doan et al. | 707/100 |
| 2007/0211623 | A1* | 9/2007 | Nishioka | 370/218 |
| 2008/0310340 | A1 | 12/2008 | Isozu | |
| 2008/0316052 | A1* | 12/2008 | Ruffini | 340/901 |
| 2009/0324222 | A1* | 12/2009 | Kunjidhapatham et al. | 398/58 |
| 2010/0142951 | A1* | 6/2010 | Armstrong et al. | 398/65 |

FOREIGN PATENT DOCUMENTS

| | | |
|---|---|---|
| JP | 2006-506843 | 2/2006 |
| JP | 4060316 | 3/2008 |
| WO | 95/18498 | 7/1995 |
| WO | 2004/015904 | 2/2004 |
| WO | 2004/045166 | 5/2004 |

OTHER PUBLICATIONS

Extended European Search Report (in English language) mailed Jun. 9, 2011 in corresponding European Patent Application No. 10733382.5.

International Search Report issued Apr. 27, 2010 in International (PCT) Application No. PCT/JP2010/000400.

K. Leibnitz et al. "*Resilient Multi-Path Routing Based on a Biological Attractor Selection Scheme*", The Second International Workshop on Biologically Inspired Approaches to Advanced Information Technology, Osaka, Japan, Jan. 2006.

C. Perkins et al., IETF RFC3561 "*Ad hoc On-Demand Distance Vector (AODV) Routing*", Jul. 2003, The Internet Society (2003).

T. Clausen et al., IETF RFC3626 "*Optimized Link State Routing Protocol (OLSR)*", Oct. 2003, The Internet Society (2003).

* cited by examiner

FIG. 2

| Destination node | Next hop | Metrics |
|---|---|---|
| 206 | 203* | 3 |
| | 207 | 4 |
| | 211 | 4 |

FIG. 3

| Destination node | Next hop | Metrics |
|---|---|---|
| 206 | 204* | 2 |
| | 209 | 2 |
| | 210 | 2 |

FIG. 6

| RREQ | Hop count | Sequence number | Address of transmission node | Address of reception node |

FIG. 7

| RREP | Hop count | Address of transmission node | Address of reception node |

FIG. 8

| Link status notification originating address | Hop count | Downstream path count |

| Destination node | Next hop | Metrics |
|---|---|---|
| 406 | 403 | 20 |
| | 404 | 5 |
| | 405 | 10 |

RELAY DEVICE, CONTROL METHOD, AND PROGRAM

TECHNICAL FIELD

The present invention relates to a relay device, a control method, and a program incorporated with the routing technology for data transmission paths in a packet exchange network such as the IP network or the wireless ad hoc network.

BACKGROUND ART

When transmitting data on a shared bandwidth network such as the IP network, it is known that the communication quality changes in time due to what is called cross traffic, which is traffic transmitted and received by other services and applications. When there is a wireless link on the communication path, the change in the link quality due to the cross traffic and external noise is particularly prominent compared to the wired link.

In the communication using wireless links, the transmitted signal wave attenuates along the transmission distance. Thus, the direct communication can only be performed with reception nodes within a predetermined range. This range differs depending on the difference of the frequency band or modulation method in the wireless communication layer. For example, according to 802.11a, which is a 5.2 GHz wireless communication method standardized by the Institute of Electrical and Electronic Engineers (IEEE), the range is approximately 70 m under a condition with a transmission power of 16 dBm, a reception sensitivity of −69 dBm, and a transmission rate of 54 Mbps. Communication with the reception nodes outside the range is performed by a bucket-brigade relay of data by another node within the area. Such a communication is referred to as a multi-hop communication.

In multi-hop communication, it is usually preferable that the data transmitted from the transmission node reaches the reception node through a shortest route. In order to do so, it is necessary for each relay node in the paths to relay data to the most suitable neighboring relay node. The process for determining the most suitable path for relaying the data from the transmission node to the reception node is referred to as routing and a protocol for the nodes when routing is referred to as the routing protocol.

Various routing protocols according to the purpose has been proposed for wireless networks, and other than selecting the shortest path, there is a protocol for choosing the path with the best transmission status as the entire path. The index for evaluating the path for a good path is referred to as the routing metrics, and there are various evaluation standards depending on the routing protocol.

The routing protocol using a single data transmission path between the transmission node and the reception node is referred to as the single path method. Optimized Link State Routing (OLSR) and Ad hoc On-Demand Distance Vector (AODV) are major single-path methods in wireless ad hoc network.

In the case of the single path method, when the quality of the link in the wireless link on the path reduces as described above, the path is cut off, stopping the data transmission, and the process for finding another path starts. The communication resumes using the newly found path. However, there is a big delay for recovering the path, and the data transmitted when the communication stopped is lost.

There is a method in which single or multiple secondary paths are provided in advance, in addition to the path used for transmission (primary path), in order to smoothly switch the path. The method is referred to as multi-path method, or multi-path routing. Patent Literature 1 discloses an example of conventional technology of multi-path routing, in which the next hop node corresponding to each path is recorded on the routing table together with the evaluation value of the path, and a path with the highest evaluation value is selected.

FIG. 12 is a structural diagram illustrating an example of the network according to the conventional technology.

When the data transmitted from the transmission node 401 to the reception node 406 is transmitted through the relay node 402, and the relay node 404, the path is the primary path. The path to the reception node 406 from the relay node 402 through the relay node 403 and the path to the reception node 406 from the relay node 402 through the relay node 405 are secondary paths provided as extra paths. The secondary paths are used as an alternative when the data transmission using the primary path fails. The routing information of the primary path and the secondary paths is recorded and managed on the routing table, according to the multi-path routing protocol.

FIG. 13 illustrates an example of the routing table managed on the relay node 402. The paths found based on the routing protocols are recorded on the routing table provided in each relay node. In the routing table, the metrics for each path is managed, in addition to the address of the relay node of next hop that is a downstream-transfer destination. Thus, when the process is in condition for switching from the primary path to the secondary path, a secondary path with the best metrics value among the secondary paths is selected as the primary path.

The number of relay node which is used for relaying the data from the relay node 402 to the reception node 406 is an example of the metrics, and this index is referred to as the hop count. Since the secondary path is found in advance and recorded on the routing table, this method has less recovery delay due to the path failure and less data loss upon switching the path, compared to the single path method.

[Citation List]
[Patent Literature 1] Japanese Patent No. 4060316
[PTL 1]
[Non Patent Literature 1] IETF RFC3651 Ad hoc On-Demand Distance Vector (AODV) Routing
[Non Patent Literature 2] IETF RFC3626 Optimized Link State Routing Protocol (OLSR)
K. Leibnitz, N. Wakamiya, and M. Murata, "Resilient multi-path routing based on a biological attractor selection scheme" in The Second International Workshop on Biologically Inspired Approaches to Advanced Information Technology (BioAdit 2006), Osaka, Japan, January 2006.

SUMMARY OF INVENTION

Technical Problem

There are two problems in the conventional multi-path methods.

The first problem is that the maintenance cost for a secondary path is necessary. When switching, at the time when the error in the primary path occurs, the path to a secondary path which is reserved in advance, error in the switched secondary path is not desirable. Thus, it is necessary to manage the status of the secondary paths even when the communication is performed using the primary path. In order to understand the status of the secondary path at all time, it is necessary to transmit the measured data at a predetermined interval, and it causes the process overhead and the communication overhead to the transmission node, the relay nodes on the secondary path, and the reception node.

In order to reduce the overhead, it is possible to lengthen the measuring interval to the secondary path, and the accuracy of finding the status of the secondary path decreases. In other words, the relationship between the overhead and the accuracy of monitoring secondary path is a tradeoff. Thus, there is a problem that determining and adjusting the equilibrium is largely dependent on the QoS capability requested by the traffic on the network and the number of reserved secondary paths.

The second problem is that, when no reserved secondary path is available at the time of switching from the primary path, there will be increased recovery delay and increased data loss due to re-searching the path, as in the single-path method.

The relay node according to the present invention solves these conventional problems, and has an object for providing a technology for securing switching to the secondary path at the time of primary path failure while minimizing the maintenance cost of the secondary path.

Solution to Problem

In order to solve the abovementioned problems, the relay device according to the present invention is a relay device in a plurality of relay devices mutually connected through links to compose a communication network, the communication network including a plurality of paths for transmitting communication data through the relay device, the relay device including: a link status receiving unit which receives at least one link status notification message which is accumulated according to a degree of maintainability of a path, at a time of link disconnecting, at each of the relay devices downstream of the relay device and is forwarded from the downstream relay device; a probability generating unit which generates a probability value according to a predetermined probability distribution; a path selection unit which selects one of the plurality of paths based on the number of the link status notification message and the probability value; and a relay processing unit which relays the communication data from upstream to a downstream relay device on the path selected by the path selection unit.

In addition, the path selection unit may further include: an activation level calculating unit which calculates an activation level indicating suitability of a selection of a primary path that is currently selected, from the plurality of paths, for transferring the communication data, based on a ratio of (a) the number of link status notification message received from a downstream relay device on a path on the plurality of paths other than the primary path to (b) the number of link status notification message received from a downstream relay device on the primary path; and a link selection unit which (i) determines a selection frequency value of each of the plurality of paths for determining a selection frequency for the path in such a manner that the smaller the suitability represented by the activation level calculated by the activation level calculating unit is, the smaller a difference between a maximum one of the selection frequency values and other selection frequency values becomes, and (ii) selects a new path for transmitting the communication data, according to a probability distribution represented by a frequency value obtained by adding the probability value generated by the probability generating unit to the determined selection frequency value for each path.

The relay device may further include a link status transmission unit which (i) generates a link status notification message concerning the relay device and transmits the generated link status notification message to an upstream relay device, and (ii) evaluates maintainability of a path at the relay device at a time of link disconnecting, based on the link status notification message received from the downstream relay device, (iii) forwards the received link status notification message to the upstream relay device only when the evaluated maintainability does not satisfy a predetermined condition, and (iv) discards the received link status notification message otherwise.

In addition, the link status transmission unit may combine the link status notification message concerning the relay device and either the number of frequency channel on the path held by the relay device or a degree of separation between the frequency channels on the path held by the relay device, and transmit the combined link status notification message to the upstream relay device.

Note that, the present invention is not only implemented by the relay device, but also as a control method for the relay device. Furthermore, the present invention may also be implemented as a program for causing a computer to execute the control method for the relay device.

ADVANTAGEOUS EFFECTS OF INVENTION

According to the present invention, it is possible to increase the maintainability of a path against the reduction in link quality or link disconnecting caused by random radio wave error and congestion, by dynamically adjusting the relay nodes to the transmission destination in consideration of the path'configuration of the relay destination, and achieve highly reliable data transmission with low consumption power.

BRIEF DESCRIPTION OF DRAWINGS

FIG. 2 illustrates an example of routing table on a relay node.

FIG. 3 illustrates an example of routing table on a relay node.

FIG. 6 illustrates an example of the format for a path request message.

FIG. 7 illustrates an example of the format for a path reply message.

FIG. 8 illustrates an example of the format for a link status notification message.

DESCRIPTION OF EMBODIMENTS

Figure 1:
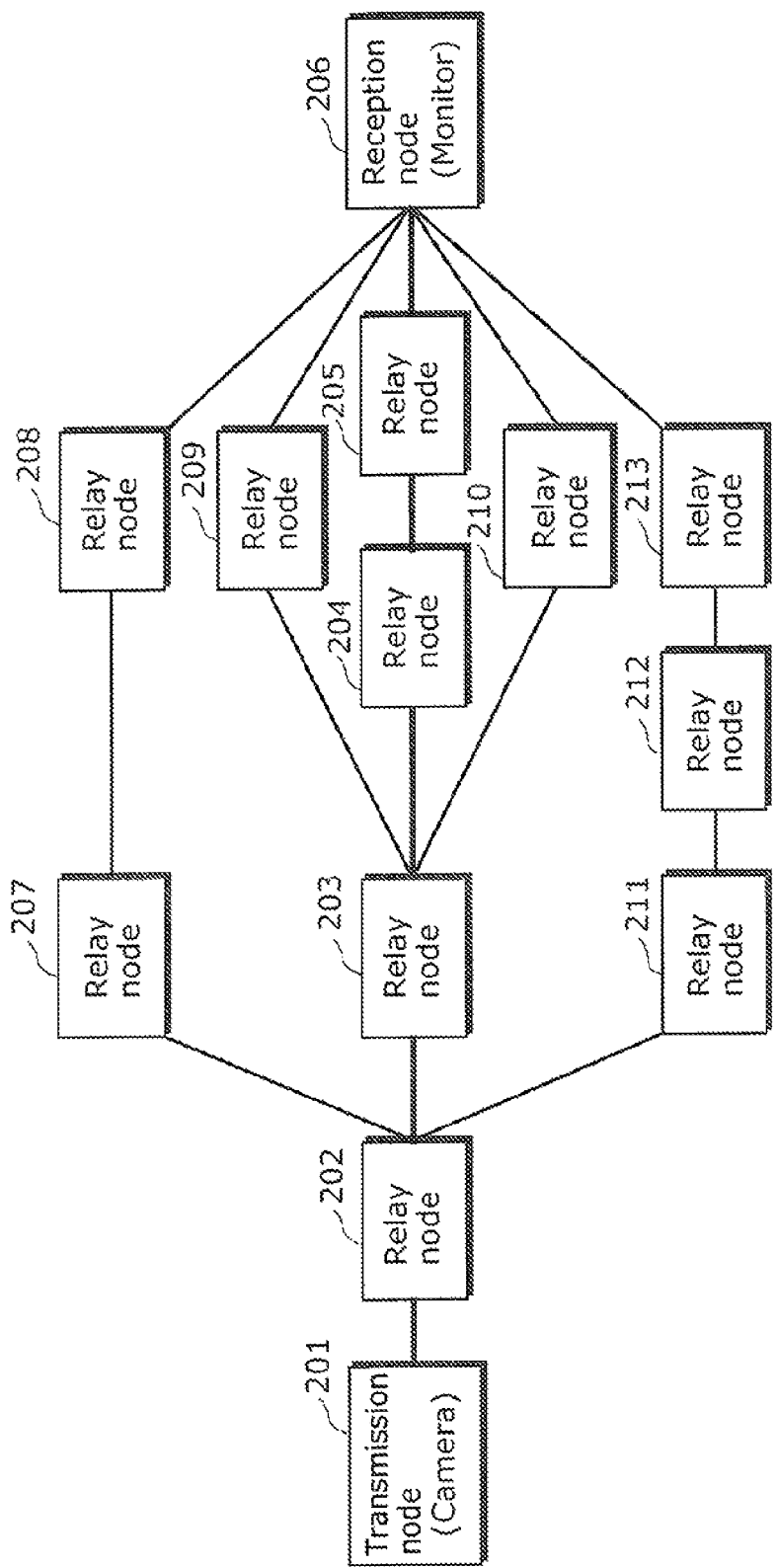
FIG. 1 illustrates an example of the network configuration according to the present invention, including relay nodes.

The following describes the embodiment of the present invention with reference to the drawing.

(Network Configuration)

FIG. 1 illustrates an example of the network configuration according to the present invention, including relay nodes.

The network illustrated in FIG. 1 is used for a camera monitoring system. The video and audio signals captured by a monitoring camera which is the transmission node 201 is transferred in a network according to the present invention including the relay nodes 202 to 205, 207 to 213 by multi-hop transfer, and reproduced and displayed by the monitor which is the reception node 206. For explanation purpose, the direction toward the transmission node 201 is referred to as upstream, and the direction toward the reception node 206 is referred to as downstream.

Such a monitoring camera system is widely used for security or safety purposes, allowing the installation to be easy by configuring the infrastructure using the wireless ad hoc network.

Routing information is managed in each relay node, according to the reactive multi-path routing protocol.

(Routing Table)

FIG. 2 illustrates and example of the routing information recorded on the routing table on the relay node 202. FIG. 3 illustrates an example of routing information recorded on the routing table on the relay node 203. The routing information on both FIG. 2 and FIG. 3 is represented by a common format, which is determined depending on the type of routing protocol. One line of routing information is a path entry corresponding to one path to one destination.

The first column of each path entry is an address of a reception node which is a destination, that is, the monitor. The second column is an address of the relay node of the next hop corresponding to three valid paths destined to the reception node. When * is added to the end of the address of next hop, it indicates that the relay node of the next hop is being used as the primary path. The third column is a metrics value which is an index for determining the quality of the path, according to the routing protocol. In general, the metrics value is determined in entire consideration of factors that could affect the quality of the path such as the hop count to the reception node and the physical bandwidth of the link.

Path entries can be registered to the routing table according to the routing protocol, in an order of finding the paths. Thus, when there are path entries with the same metrics value about the same destination, the next of the primary path is selected, according to the path entry on the routing table.

According to this rule, the relay node 202 currently selects the relay node 203 as the next hop in downstream, and the relay node 203 selects the relay node 204. Thus, the primary path for sending data from the transmission node 201 to the reception node 206 is a path through the relay nodes 202, 203, 204, and 205.

(Configuration of Relay Node)

Figure 4:
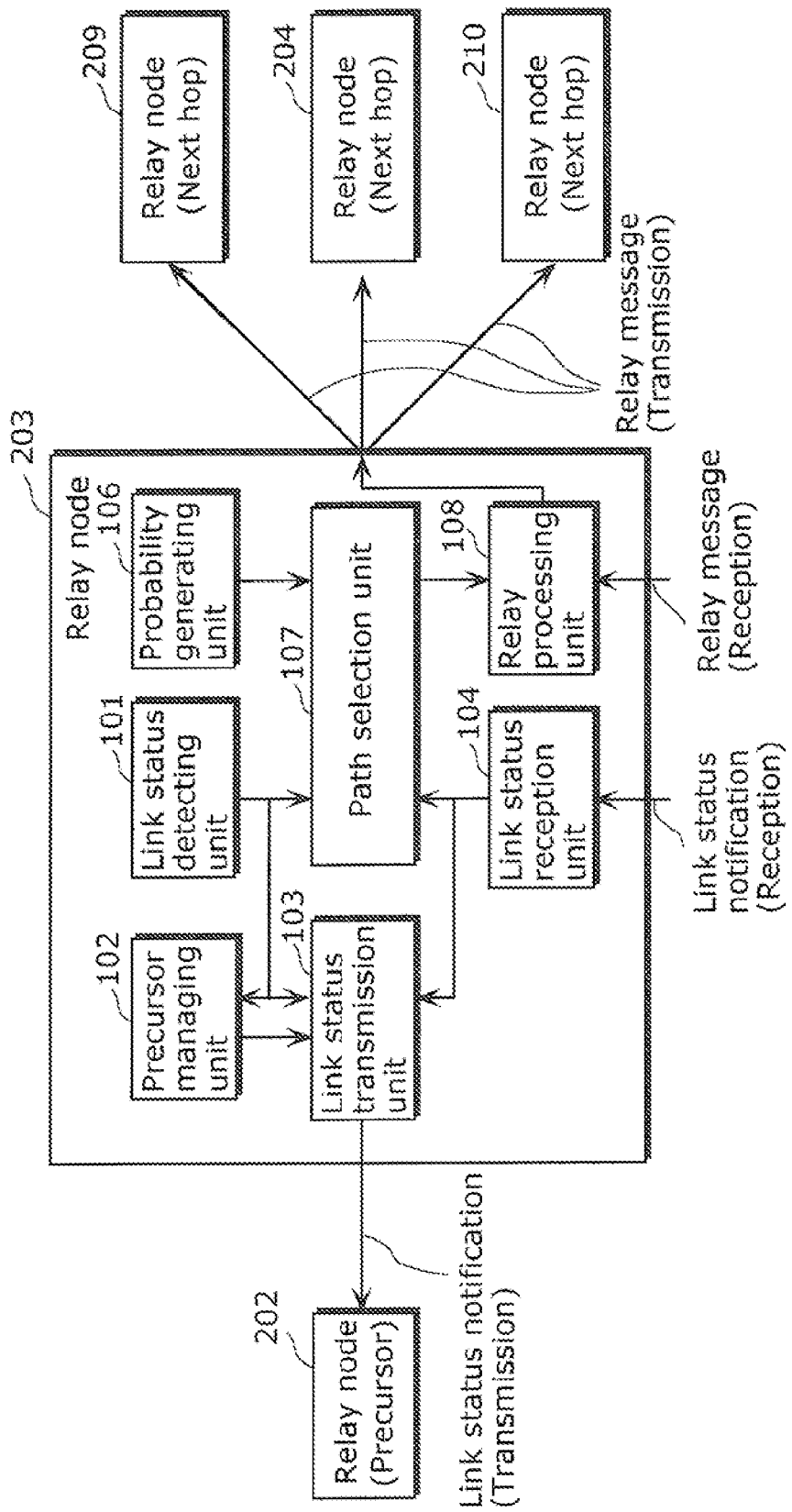
FIG. 4 is a functional block diagram illustrating an example of the configuration of the relay node.

FIG. 4 is a functional block diagram illustrating an example configuration of the relay node 203. The description for the relay nodes 202 to 205, 207 to 213 is omitted, since they have the same configuration as the relay node 203.

The relay node 203 includes a link status detecting unit 101, a precursor managing unit 102, a link status transmission unit 103, a link status receiving unit 104, a probability generating unit 106, a path selection unit 107, and a relay processing unit 108.

The link status receiving unit 104 receives a link status notification message which indicates a degree of maintainability of a path at a downstream relay node at a time of link disconnecting at a downstream relay node, from the downstream relay node within a predetermined range.

The path selection unit 107 controls the relay processing unit 108 to send communication data stochastically using all secondary paths, according to the reduction in the maintainability of a path at the time of link disconnecting at the downstream of the primary path, represented by the received link status notification message. The probability using the secondary path is determined according to the probability value generated by the probability generating unit 106.

Transmitting part of the communication data stochastically using all of the secondary paths allows finding out whether or not the secondary paths are available. When there is a secondary path that is unavailable, the secondary path is removed, and data is transmitted using the other secondary paths.

The relay node 203 (the same applies to the relay nodes 202 to 205, and 207 to 213) does not detect the status of the secondary path when the maintainability of the path against the link disconnecting is retained in the downstream of the primary path. The relay node 203 finds out the status of the secondary path for the first time when the reduction in the maintainability of a path against the link disconnecting is detected in the downstream of the primary path, by transmitting part of data to the secondary path.

This eliminates the communication only for finding out the status of the secondary path, allowing the maintenance cost for the path to minimum.

As such, the first problem of the conventional technology is solved.

Furthermore, the relay node 203 (the same applies to the relay nodes 202 to 205, 207 to 213), transmits part of the communication data stochastically, using all of the secondary paths, according to the reduction in the maintainability of the path against the link disconnecting at the downstream of the primary path.

With this, instead of attempting the switch to the secondary path after the primary path is completely cut off, it is possible to understand the status of the secondary path registered to the routing table while continuing the data transmission using the primary path. Thus, for example, even in the case where a difficult situation, for example, a case where all of the secondary paths are unavailable, it is possible to have some time for searching for a new secondary path before the primary path is completely cut off. As a result, it is possible to limit the recovery delay when the primary path is cut off, and to minimize the data loss generated when switching the path.

As such, the second problem of the conventional technology is solved.

The description of the relay node 203 in detail continues.

Figure 5:
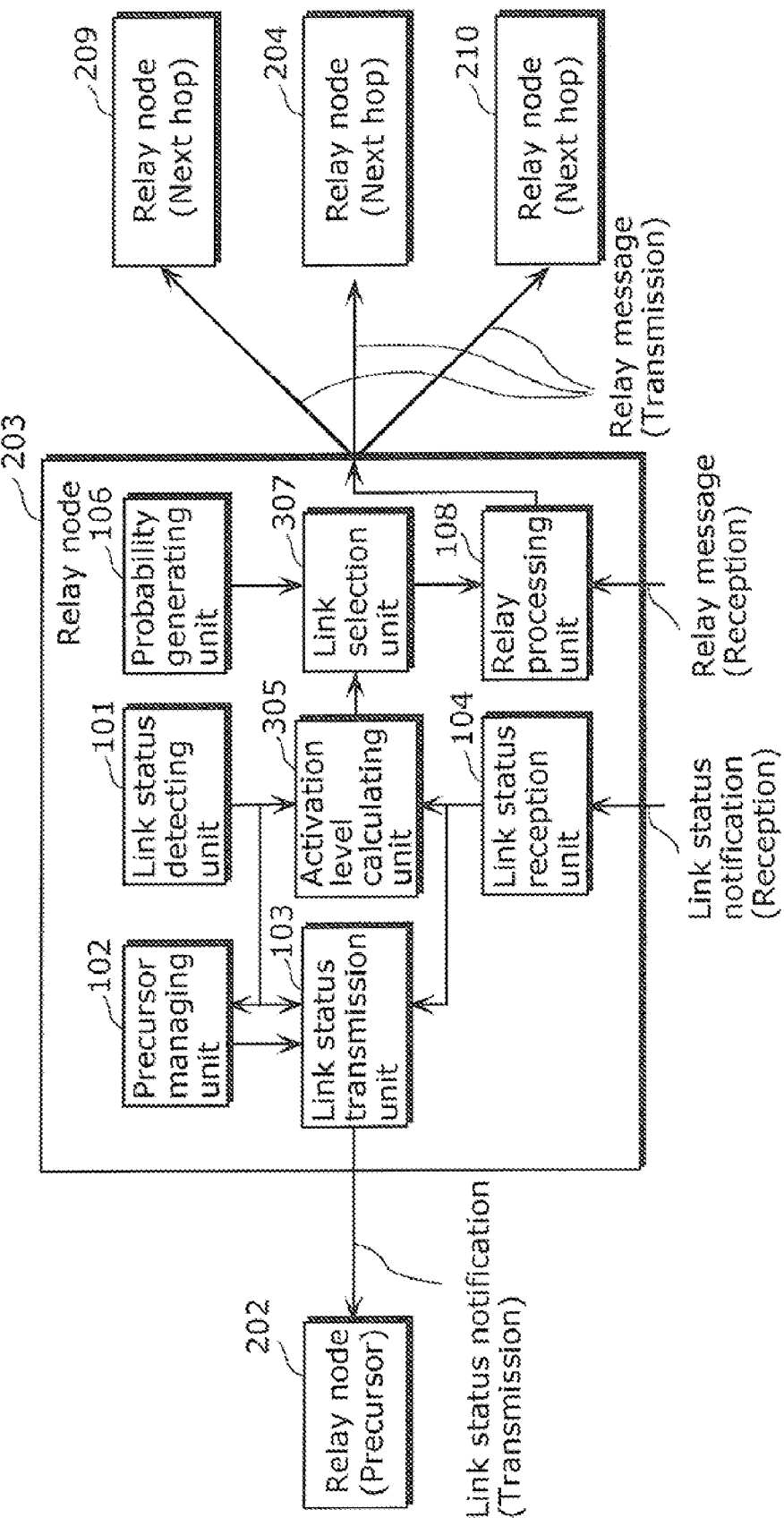
FIG. 5 is a functional block diagram illustrating an example of the detailed configuration of the relay node.

FIG. 5 is a functional block diagram illustrating an example configuration of the relay node 203. In FIG. 5, the path selection unit 107 illustrated in FIG. 4 is embodied as the activation level calculating unit 305 and the link selection unit 307.

When the transmission quality in the downstream of the primary path decreases, the relay node 203 calculates information referred to as an activation level in order to stochastically select a downstream relay node while maintaining a probability balance adapted to the change in the status, and uses the activation level. The downstream link is selected based on the activation level and a probability value generated by the probability generating unit 106, and the activation level calculating unit 305 is a structure for that.

The following describes the operations of each component in detail.

(Link Status Detecting Unit 101)

When the reception node 206 that is a destination of the communication is determined, the transmission node 201 in FIG. 1 performs processing for finding a path from the transmission node 201 to the reception node 206. The process for finding the path starts by broadcasting a path request (RREQ) message to nodes within a range where the radio wave can reach.

FIG. 6 illustrates an example of the format of the RREQ message.

The solid line connecting the nodes in FIG. 1 represents the area where the radio wave can reach. Suppose the radio wave from each node can only reaches a neighboring node to which the solid line is drawn, the RREQ message issued by the transmission node 201 can only be received by the relay node 202. The RREQ message cannot be received by the other relay nodes 202 to 205, and 206 to 213, and the reception node 206, due to propagation loss.

The relay node 202 that received the RREQ message detects that the transmission node 201 is an upstream node that can directly communicate, and adds, to the routing table, that path entry information indicating that the next hop back to the transmission node 201 is the transmission node 201.

Furthermore, the relay node 202 does not have a direct path to the reception node 206. Thus, the relay node 202 broadcasts the received RREQ message again to the nodes located within the range where the radio wave from the relay node 202 can reach.

The RREQ message is also received by the precursor that is a relay node neighboring in the upstream direction. However, the RREQ message is discarded by the precursor, since matching sequence number allows detection that the message is an already processed RREQ message. As a result, the RREQ message can only be received by the relay nodes 203, 207, and 211, which are the downstream relay nodes.

The RREQ message is processed in the same manner in the other relay nodes 203 to 206, and 207 to 213. Consequently, the RREQ message arrives at the reception node 206 through five paths illustrated in FIG. 1.

The reception node 206 sends a path reply (RREP) message to the relay nodes 205, 208, 209, 210, and 213.

FIG. 7 illustrates an example of the format of the RREP message.

The relay node 205 which received the RREP message detects that the RREP message has been received through direct communication from the reception node, and adds, to the routing table of the relay node 205, a path entry which represents that the next hop to the reception node 206 is the reception node 206 itself. The relay node transfers RREP to the precursor by unicast, using the path entry in an opposite direction indicating that the next hop back to the transmission node is the relay node 204.

The RREP message is processed in the same manner in the other four relay nodes 208, 209, 210, 213. During the transfer or the RREP message, three path entries from the transmission node 201 to the reception node 206 are added to the relay nodes 202 and 203.

The hop count in the RREQ message in FIG. 6 is set to be 0 at the transmission node, and the hop count in the RREP message in FIG. 7 is set to be 0 at the reception node. Each relay node increments the hop count in conjunction with the relay operation. Thus, the metrics value in the third column in the routing table illustrated in FIGS. 2 and 3 is determined when adding the path entry to the routing table.

(Precursor Managing Unit 102)

It is possible to detect a relationship between the upstream and the downstream from the relay node as a reference, at the timing when the routing table is generated by the link status detecting unit 101. The precursor managing unit 102 records, inside the precursor managing unit 102, the other relay node adjacent to the upstream of the relay node on the path from the transmission node to the reception node as a precursor, based on the detection result.

(Link Status Transmission Unit 103)

The link status transmission unit 103 generates a link status notification message including the number of the downstream path that the relay node has toward the reception node, and transmits the generated link status notification message to the precursor recorded on the precursor managing unit 102.

FIG. 8 illustrates an example of the format of the link status notification message. The link status notification originating address is the address of the relay node which generated the link status notification message, and the hop count is set to be 0. The downstream path count is detected by the link status detecting unit 101, and is the total number of the primary path and the secondary path of the path from the transmission node 201 to the reception node 206, which is added to the routing table.

The link status transmission unit 103 also evaluates maintainability of a path at the relay node at a time of link disconnecting, based on the link status notification message received from the downstream relay node received by the downstream relay node by the link status receiving unit 104. Subsequently, the link status transmission unit 103 forwards the link status notification message to the precursor only when the evaluated maintainability is determined not satisfying the predetermined standard, and discard the link status notification message otherwise. The link status transmission unit 103 increments the hop count of the link status notification message, when forwarding the link status notification message.

With this, the link status notification message is forwarded to the upstream relay nodes cumulatively in a network period thought to be of smaller maintainability at the time of the link disconnecting. Subsequently, forwarding the link status notification message ends at the relay node that is determined to have a maintainability of a path against link disconnecting high enough to satisfy the predetermined standard.

The link status transmission unit 103 may determine that the maintainability of a path at the relay node itself at the time of link disconnecting is low, when the number of paths from which the link status notification message is received (that is, the number of relay nodes to be the next hop) is smaller than the predetermined threshold when forwarding the link status notification message, for example.

More specifically, when the threshold is 2, the link status transmission unit 103 forwards the received link status notification message to the precursor only when one or more link status notification messages are received from only one relay node (that is, there is no detour since there is only one relay node to be the next hop). With this configuration, the link status notification message cumulatively transmitted to the upstream in a period with no detour due to single-link connection. With this, the link status notification message as many as the number of link without a detour downstream, moves up from the downstream path.

As a result, each of the relay nodes can find out that a downstream path from which more link status notification messages are transmitted has a longer period. Thus, it is possible to determine that such a downstream path has low maintainability of the path against the link disconnecting.

Note that, in order to limit the range where the link status notification message is transmitted, forwarding the link status notification message with the hop count equal to or more than the predetermined threshold (for example, the hop count is five or more) may be unconditionally cut off.

Note that, the example described above explains an example where the link status notification message is forwarded to the precursor when the number of paths from which the link status notification message is sent is smaller than the predetermined threshold. However, the link status notification message may be forwarded to the precursor when, for example, the sum of the reciprocal of the number of the link status notification message transmitted from the downstream path is smaller than the predetermined threshold.

With this configuration, reducing the weight on the path with a long period without a detour allows more appropriate evaluation of the maintainability of the path at the relay node itself at the time of link disconnecting.

The information regarding the frequency channel may also be used as other information upon determining whether or not the link status notification message is to be forwarded.

The relay node with the multi-interface can use multiple frequency channels at the same time. For example, according to IEEE 802.11b which uses 2.4 GHz ISM band has 14 communication channels in the available bands, and 4 channels among them can be used at the same time.

In the case where the relay node has multiple paths on both the first channel and the sixth channel, the relay node has higher maintainability against the interference wave, rather than having multiple paths only on the first channel.

Thus, when evaluating the maintainability of the path at the relay node that transmitted the number of frequency channels of the path held by the relay node and received the link status notification message, to the link disconnecting, the weight on the path from which the link status notification message indicating that the number of the frequency channel is small is sent may be lowered.

In addition, in the case where the relay node has multiple paths on both the first channel and the thirteenth channel, the relay node has higher maintainability of the path against the interference wave, rather than having multiple paths on the first channel and the sixth channel.

Thus, when transmitting, to the upstream relay node, a degree of separation between the frequency channels on the path held by the relay node by including the link status notification message to evaluate the maintainability of the path at the relay node, at the time of link disconnecting, that received the link status notification message, the weight on the path from which the link status notification message indicating that the distance between the frequency channels is small is sent may be lowered.

In addition, the maintainability of the path at the relay node at the time of link disconnecting may be evaluated by combining the number of the link status notification message from each downstream path and the number of frequency channels indicated by the link status notification message and the weight.

(Link Status Receiving Unit 104)

The link status receiving unit 104 receives the link status notification message transmitted by the link status transmission unit 103 in the downstream relay node.

In FIG. 1, the relay node 203 is the precursor of the relay node 204, 209, and 210. Thus, the relay node 203 finds out that the relay node 203 has three downstream paths by receiving the link status notification messages transmitted from the relay nodes 204, 209, and 210.

When the relay node 203 received a link status notification message from the relay node the number of which is more than the threshold (typically, when the link status notification messages are received from two or more relay nodes, and it is clear that there is a detour), the forwarding of the link status notification message received from the relay nodes 204, 209, and 210 ends, and the message is not forwarded to upstream further.

On the other hand, when the link status notification message is received from the relay node less than the threshold (typically, when the link status notification message is received from only one relay node, and it is clear that there is no detour), the link status receiving unit 104 forwards to relay the link status notification message received from the downstream node to the link status transmission unit 103.

With this, the link status notification message is transmitted in a period where the path is connected by a single link and has no detour. Furthermore, with this relay operation, the relay may be unconditionally terminated using the hop count of the link status notification message is used as a threshold and when the hop count is 5 or more, for example.

(Activation Level Calculating Unit 305)

The activation level calculating unit 305 calculates the activation level α which represents suitability of the primary path currently used for data transmission among the reserved paths, compared to the other secondary paths. Equation 1 shows a specific example of the case where the activation level α is controlled by the dynamics.

[Equation 1]

$$\frac{d\alpha}{dt} = \delta \cdot \left( \frac{1}{1+\exp\left(-K \cdot \left(\frac{\min\left\{M, \min\{l_{sec(i)}/l_{prim}\}\right\}}{M} - C\right)\right)} - \alpha \right) \quad \text{(Equation 1)}$$

In Equation 1, α denotes an activation level defined in a closed interval [0, 1], $l_{prim}$ denotes the number of link status notification messages received from the primary path, $l_{sec(i)}$ denotes the number of link status notification messages received from $i^{th}$ secondary path, M and C denote adjustment factors, K denotes the intermediate state of the activation level, that is, a constant that determines the speed of transition from 0 to 1, and δ denotes a constant for determining a response speed of the activation level α.

According to this dynamics, the activation level α changes within the [0, 1] interval according to the transition profile dependent on K, based on the estimated value of the link status of the node itself including the status of the secondary path in the downstream path. The value of activation level α can be updated according to Equation 2.

[Equation 2]

$$\alpha_{current} = \alpha_{prev} + \frac{d\alpha}{dt} \cdot \Delta t \quad \text{(Equation 2)}$$

In Equation 2, $\alpha_{current}$ denotes the activation level value after the update, $\alpha_{prev}$ denotes the activation level value before the update, and Δt denotes the update interval. The update interval may be measured by controlling a timer and others in conjunction with the event of notifying the link information.

(Probability Generating Unit 106)

The probability generating unit 106 generates a probability value with randomness necessary for the link selection unit 307 to stochastically select the downstream path for sending the data. As the probability distribution, although the uniform distribution (a=0, b=1) is applicable, for example, the probability distribution is not limited to this.

[Equation 3]

$$P(x) = \begin{cases} 1/(b-a) & (a \leq x \leq b) \\ 0 & (\text{otherwise}) \end{cases} \quad \text{(Equation 3)}$$

The probability value η(i) is given by Equation 4.

[Equation 4]

$$\eta(i) = \text{Random}[-0.5, +0.5] \quad \text{(Equation 4)}$$

The variation range of the probability value may be limited to a range which is symmetric peak-to-peak from 0, the reference.

(Link Selection Unit 307)

The link selection unit 307 stochastically selects a next hop node corresponding to a path for transmitting the communication data, according to the activation level controlled by the activation level calculating unit 305 and the probability value generated by the probability generating unit 106. Equation 5 can be used as a method for selecting the next hop node, for example.

[Equation 5]

$$\frac{dm(i)}{dt} = \frac{\alpha \cdot (\beta \cdot \alpha^\gamma + \varphi)}{1 + (\max\{m(i)\})^2 - m(i)^2} - \alpha \cdot m(i) + w \cdot \eta(i) \quad \text{(Equation 5)}$$

In Equation 5, m(i) denotes a selection frequency of $i^{th}$ next hop node, β, γ, and φ are constants for controlling the speed of change in dynamics, η(i) is a probability value generated by the probability generating unit 106 and which affects the selection probability of the path, and w is a constant denoting a probability amplitude. According to Non-Patent Literature 3, the steady-state solution of the nonlinear ordinary differential equation to the primary path is represented by Equation 6.

[Equation 6]

$$m(i) = \beta \cdot \alpha^\gamma + \varphi \quad \text{(Equation 6)}$$

In addition, Equation 7 represents the steady-state solution for the secondary path.

[Equation 7]

$$m(i) = \frac{1}{2}\left[\sqrt{4 + (\beta \cdot \alpha^\gamma + \varphi)^2} - (\beta \cdot \alpha^\gamma + \varphi)\right] \quad \text{(Equation 7)}$$

It is possible to determine, based on Equation 8, $m(i)_{current}$ the path selection frequency after the update, using $m(i)_{prev}$, the path selection frequency before the update, using the change in the path selection frequency m(i) calculated in Equation 5.

[Equation 8]

$$m(i)_{current} = m(i)_{prev} + \frac{dm(i)}{dt} \cdot \Delta t \quad \text{(Equation 8)}$$

In Equation 8, ΔT denotes a time interval determined by the update cycle of the path selection frequency.

Normalizing the selection frequency on each path determined by Equation 8 allows determining a selection probability of each path.

[Equation 9]

$$\tilde{m}(i) = \frac{m(i)}{\sum_{k=1}^{N} m(k)} \quad \text{(Equation 9)}$$

When the activation level is α=1, the path selection frequency for the secondary path is a finite value obtained by substituting α=1. This represents that the data flows to the secondary path even when the activation level α is higher than the threshold $α_{th}$, using the path selection probability determined in Equation 9.

When transmitting data only to the primary path when the activation level is equal to or higher than the threshold, it is necessary to perform threshold processing using the selection probability threshold $m_{th}$ and re-normalization in addition to Equation 9. This process may also be performed by Equation 10 and Equation 11, for example.

[Equation 10]

$$\tilde{m}(i)' = \begin{cases} 0 & (\tilde{m}(i) \leq m_{th}) \\ \tilde{m}(i) & (\tilde{m}(i) > m_{th}) \end{cases} \quad \text{(Equation 10)}$$

[Equation 11]

$$\hat{m}(i) = \frac{\tilde{m}(i)'}{\sum_{k=1}^{N} \tilde{m}(k)'} \quad \text{(Equation 11)}$$

(Relay Processing Unit 108)

The relay processing unit 108 transmits the video and audio data to a downstream relay node selected by the link selecting unit 307 as a relay.

(Example of Operation by Relay Node)

The following describes an example of the operation of the entire operation for sending the data from the transmission node 201 to the reception node 206 in the network in FIG. 1.

As the initial state, suppose a case where the path through the relay nodes 202 to 205 is selected as the primary path from the transmission node 201 to the reception node 206.

Figure 9:
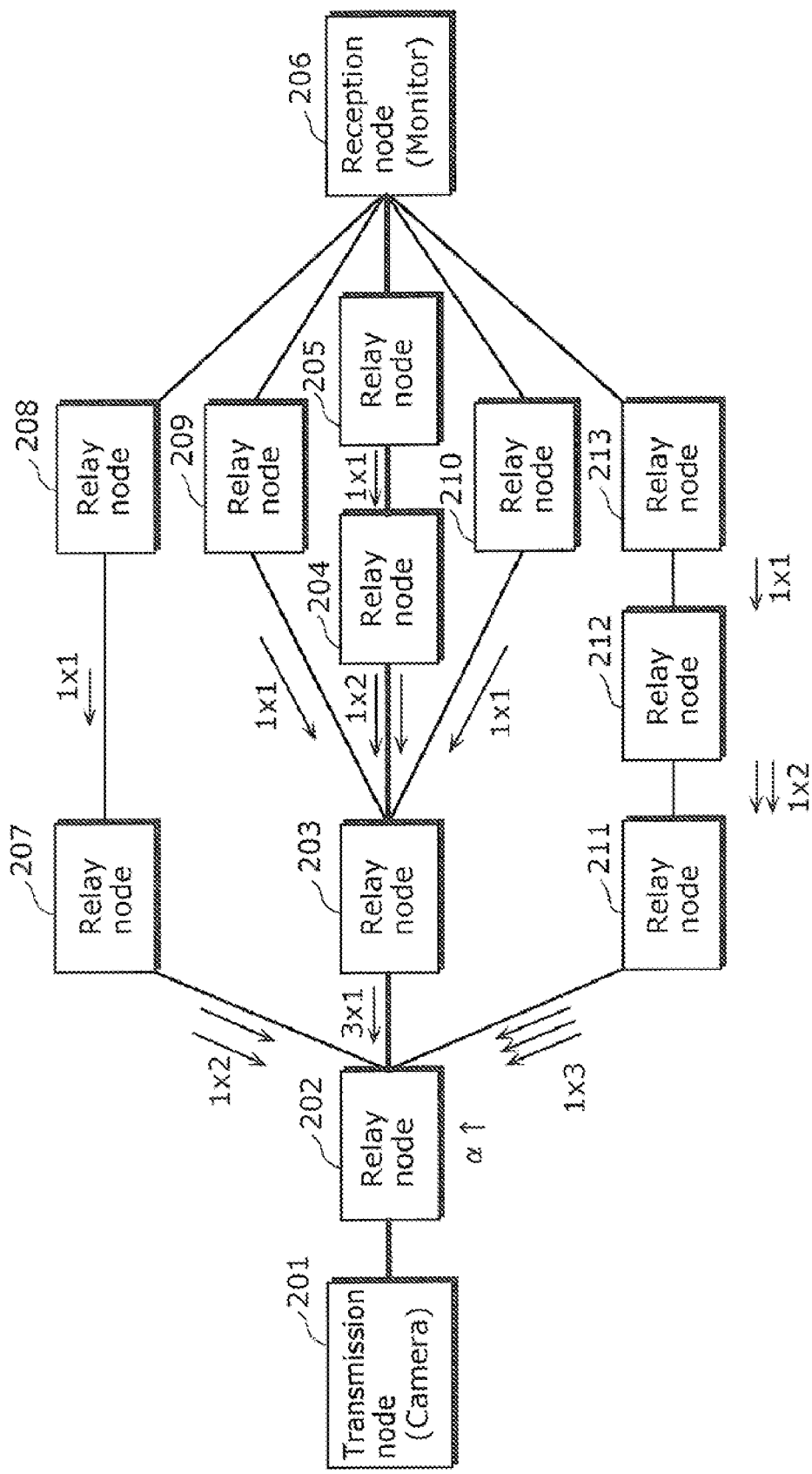
FIG. 9 illustrates an example of the initial state of the camera monitoring system according to the first embodiment.

FIG. 9 illustrates the link status notification messages transmitted upstream from each relay node in the initial state.

In FIG. 9, one arrow along with the paths between the relay nodes indicates one link status notification message. The representation p×q along the paths between the relay nodes indicates that q link status notification messages indicating that the number of the downstream paths is p are transmitted through the path.

The relay node 203 receives one, two, and one link status notification messages from the relay nodes 204, 209, 210, which are three downstream paths, respectively. The relay node 203 discards the link status notification message without forwarding the link status notification message received from the relay nodes 204, 209, and 210 to the relay node 202, based on the comparison between the path count 3, which is the number of paths from which the link status notification message is received, and two, which is the threshold. The relay node 203 transmits only one link status notification message indicating that the number of downstream path is three, generated by the relay node 203 itself, to the relay node 202.

The relay node 207 receives one link status notification message indicating that the number of downstream path is one, from the only relay node 208 of the downstream path. The relay node 211 receives two link status notification messages indicating that the number of downstream path is one, from the only relay node 212 of the downstream path.

The relay nodes 207 and 211 transmits the received link status notification messages to the relay node 202, together with the link status notification message generated by the relay nodes 207 and 211, respectively, indicating that the number of downstream path is one.

As a result, the relay node 202 receives one, two, and three link status notification messages from the relay node 203 of the primary path, and the relay nodes 207 and 211 from the secondary paths, respectively. When the number of link status notification messages from the primary path received by the relay node 202 is at minimum, the activation level α of the relay node 202 is stable at a high value.

Figure 10:
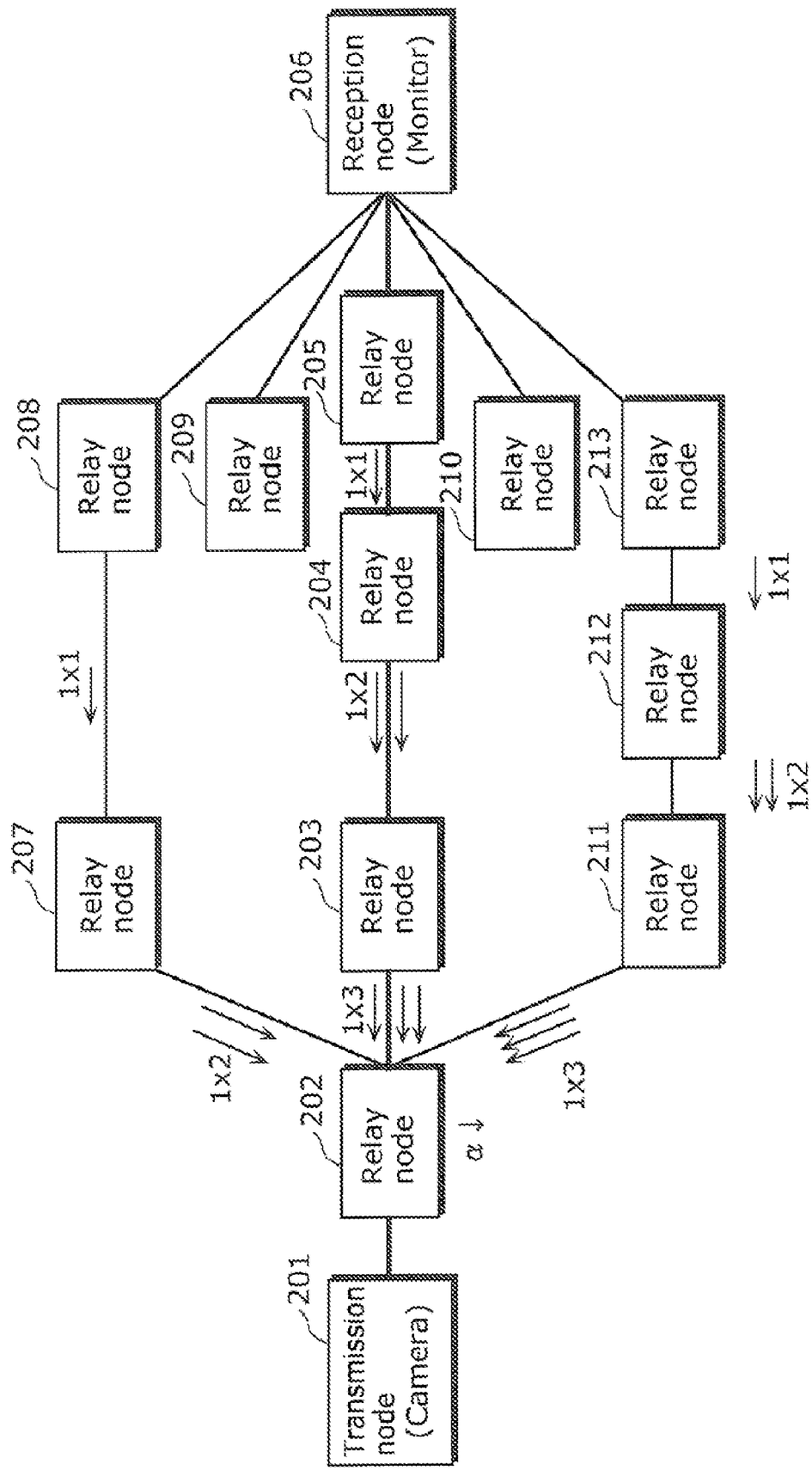
FIG. 10 illustrates an example of the transient state of the camera monitoring system according to the first embodiment.

FIG. 10 illustrates link status notification messages transmitted in a transient state immediately after several wireless links are cut off. In the same manner as FIG. 9, the arrow indicating the link status notification message and p×q indicating that q link status notification messages indicating that the number of the downstream path is p are shown. The relay node 203 receives two link status notification messages indicating that the number of downstream path is one, from the only relay node 204 of the downstream path. Thus, the relay node 203 sends the received link status notification message to the relay node 202, together with the link status notification message generated by the relay node 203, indicating that the number of downstream path is 1.

As a result, the relay node 202 receives three, two, and three link status notification messages from the relay node 203 on the primary path, and the relay nodes 207 and 211 on the secondary paths, respectively. The number of the link status notification messages that the relay node 202 receives from the primary path exceeds the number of the link status notification messages that the relay node 202 receives from the secondary paths and the activation level α decreases on the relay node 202 according to Equation 1. Thus, the re-selection of the primary path based on Equation 5 becomes more likely to occur.

Figure 11:
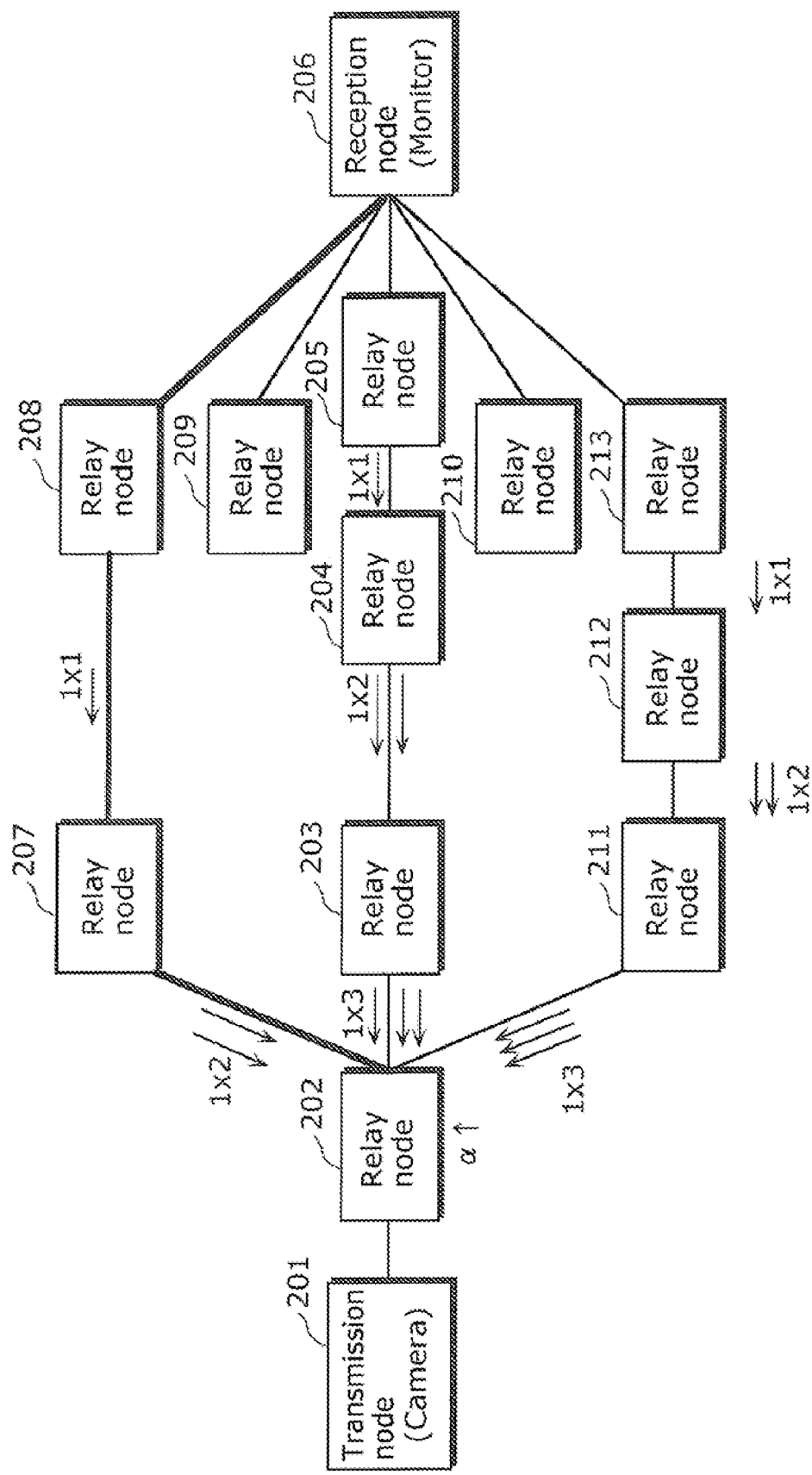
FIG. 11 illustrates an example of the stable state of the camera monitoring system according to the first embodiment.
Figures 12, 13:
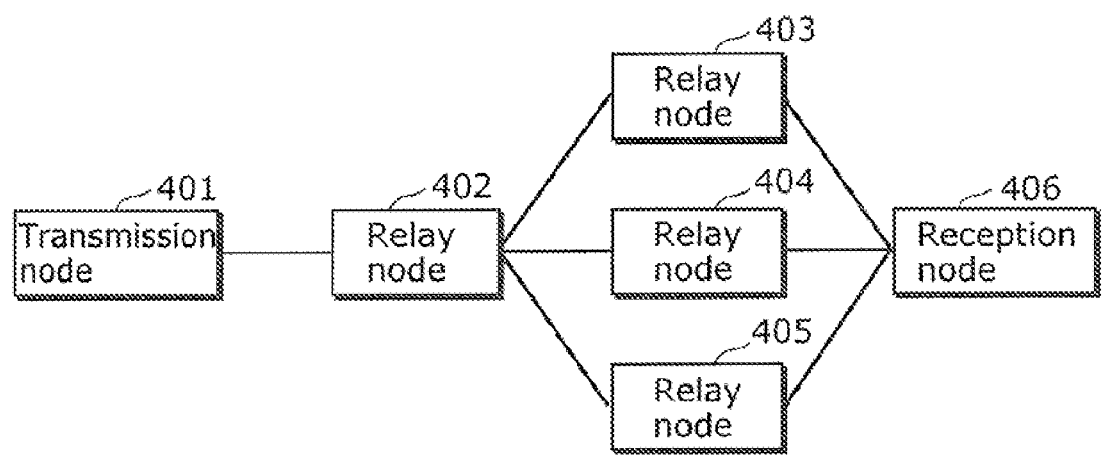
FIG. 12 is a structural diagram illustrating an example of the network according to the conventional technology.
FIG. 13 illustrates an example of the routing table according to the conventional technology.

FIG. 11 illustrates a state where the path through the relay nodes 202, 207, and 208 is made to a primary path, as a result of the re-selection. In the same manner as FIG. 9, the arrow indicating the link status notification message and p×q indicating that q link status notification messages indicating that the number of the downstream path is p are shown.

In the stable state, the activation level α on the relay node 202 becomes a high value again when the number of the link status notification messages received by the relay node 202 from the primary path becomes at minimum. As a result, the re-selection of the primary path according to Equation 5 is less likely to occur, stabilizing the selection state of the primary path.

As such, according to this embodiment, a safe path which has the highest maintainability of the path at the time of link disconnecting is more likely to be selected (stochastically selected) as the primary path. Therefore, it is possible to perform more reliable communication.

[Industrial Applicability]

The present invention is applicable to a communication device with a routing technology for a data transmission path in a packet exchange network such as the IP network and the wireless ad hoc network, a communication method, and a program.

[Reference Signs List]

| | |
|---|---|
| 101 | Link status detecting unit |
| 102 | Precursor managing unit |
| 103 | Link status transmission unit |
| 104 | Link status receiving unit |
| 106 | Probability generating unit |
| 107 | Path selection unit |
| 108 | Relay processing unit |
| 201 | Transmission node |
| 202 to 205, 207 to 213 | Relay node |
| 206 | Reception node |
| 305 | Activation level calculating unit |
| 307 | Link selection unit |
| 401 | Transmission node |
| 402 to 405 | Relay node |
| 406 | Reception node |

The invention claimed is:

1. A relay device in a plurality of relay devices including one or more upstream relay devices and one or more downstream relay devices mutually connected through links to compose a communication network, the communication network including a plurality of paths for transmitting communication data through said relay device, said relay device comprising:

a memory storing instructions;

a processor configured to execute said instructions to perform a method comprising:

receiving at least one link status notification message accumulated according to a degree of maintainability of a path, at a time of link disconnecting, at each of a plurality of relay devices located downstream of said relay device and wherein the notification message is forwarded from one of the downstream relay devices;

generating a probability value according to a predetermined probability distribution;

selecting one of the plurality of paths based on the number of the link status notification messages and the probability value; and relaying the communication data from one of the upstream relay devices to one of the downstream relay devices on the path selected by said selecting, wherein said selecting further includes:

calculating an activation level indicating suitability of a selection of a primary path that is currently selected, from the plurality of paths, for transferring the communication data, based on a ratio of (a) the number of link status notification messages received from one of the downstream relay devices on a path on the plurality of paths other than the primary path to (b) the number of link status notification messages received from one of the downstream relay devices on the primary path; and (i) determining a selection frequency value of each of the plurality of paths for determining a selection frequency for the path, wherein the smaller the suitability represented by the activation level calculated by said calculating is, the smaller a difference between a maximum one of the selection frequency values and other selection frequency values becomes, and to (ii) selecting a new path for transmitting the communication data, according to a probability distribution represented by a frequency value obtained by adding the probability value generated by said generating to the determined selection frequency value for each path.

2. The relay device according to claim 1, further comprising link status transmitting that (i) generates a link status notification message concerning said relay device and to transmit the generated link status notification message to an upstream relay device, and to (ii) evaluates maintainability of a path at said relay device at a time of link disconnecting, based on the link status notification message received from the downstream relay device, to (iii) forward the received link status notification message to the upstream relay device only when the evaluated maintainability does not satisfy a predetermined condition, and to (iv) discard the received link status notification message otherwise.

3. The relay device according to claim 1, wherein said link status transmitting combines the link status notification message concerning said relay device and either the number of frequency channels on the path held by said relay device or a degree of separation between the frequency channels on the path held by said relay device, and to transmit the combined link status notification message to one of the upstream relay devices.

4. A control method for controlling a relay device in a plurality of relay devices including one or more upstream relay devices and one or more downstream relay devices mutually connected through links to compose a communication network, the communication network including a plurality of paths for transmitting communication data through said relay device, said control method comprising:
receiving at least one link status notification message accumulated according to a degree of maintainability of a path, at a time of link disconnecting, at each of a plurality of relay devices located downstream of said relay device and wherein the notification message is forwarded from one of the downstream relay devices;
generating a probability value according to a predetermined probability distribution;
selecting one of the plurality of paths based on the number of the link status notification messages and the probability value; and
relaying the communication data from one of the upstream relay devices to one of the downstream relay devices on the path selected by said selecting,
wherein said selecting further includes:
calculating an activation level indicating suitability of a selection of a primary path that is currently selected, from the plurality of paths, for transferring the communication data, based on a ratio of (a) the number of link status notification messages received from one of the downstream relay devices on a path on the plurality of paths other than the primary path to (b) the number of link status notification messages received from one of the downstream relay devices on the primary path; and
determining a selection frequency value of each of the plurality of paths for determining a selection frequency for the path,
wherein the smaller the suitability represented by the activation level calculated by said calculating is, the smaller a difference between a maximum one of the selection frequency values and other selection frequency values becomes, and selecting a new path for transmitting the communication data, according to a probability distribution represented by a frequency value obtained by adding the probability value generated by said generating to the determined selection frequency value for each path.

5. A non-transitory computer-readable recording medium in which a computer program is stored, the program for controlling a relay device in a plurality of relay devices including one or more upstream relay devices and one or more downstream relay devices mutually connected through links to compose a communication network, the communication network including a plurality of paths for transmitting communication data through said relay device, the program, when loaded into a computer, causing the computer to execute:
receiving at least one link status notification message accumulated according to a degree of maintainability of a path, at a time of link disconnecting, at each of a plurality of relay devices located downstream of said relay device and wherein the notification message is forwarded one of the downstream relay devices;
generating a probability value according to a predetermined probability distribution;
selecting one of the plurality of paths based on the number of the link status notification messages and the probability value; and
relaying the communication data from one of the upstream relay devices to one of the downstream relay devices on the path selected by said selecting,
wherein said selecting further includes:
calculating an activation level indicating suitability of a selection of a primary path that is currently selected, from the plurality of paths, for transferring the communication data, based on a ratio of (a) the number of link status notification messages received from one of the downstream relay devices on a path on the plurality of paths other than the primary path to (b) the number of link status notification messages received from one of the downstream relay devices on the primary path; and
determining a selection frequency value of each of the plurality of paths for determining a selection frequency for the path,
wherein the smaller the suitability represented by the activation level calculated by said calculating is, the smaller a difference between a maximum one of the selection frequency values and other selection frequency values becomes, and selecting a new path for transmitting the communication data, according to a probability distribution represented by a frequency value obtained by adding the probability value generated by said generating to the determined selection frequency value for each path.

* * * * *